June 28, 1960
M. C. HUFFMAN ET AL
2,942,578
ROCK DRILL
Filed April 24, 1957
2 Sheets-Sheet 1
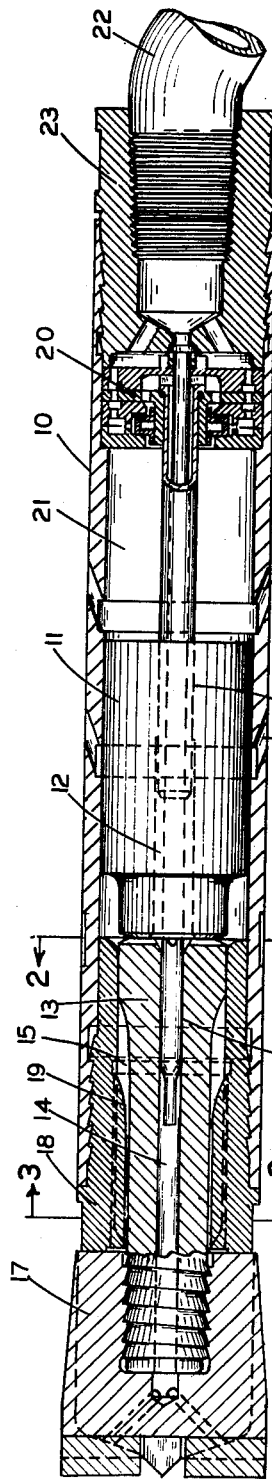
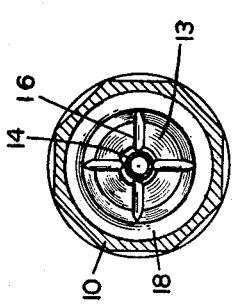
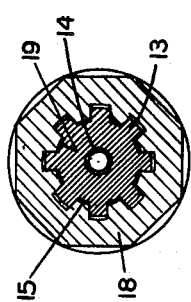
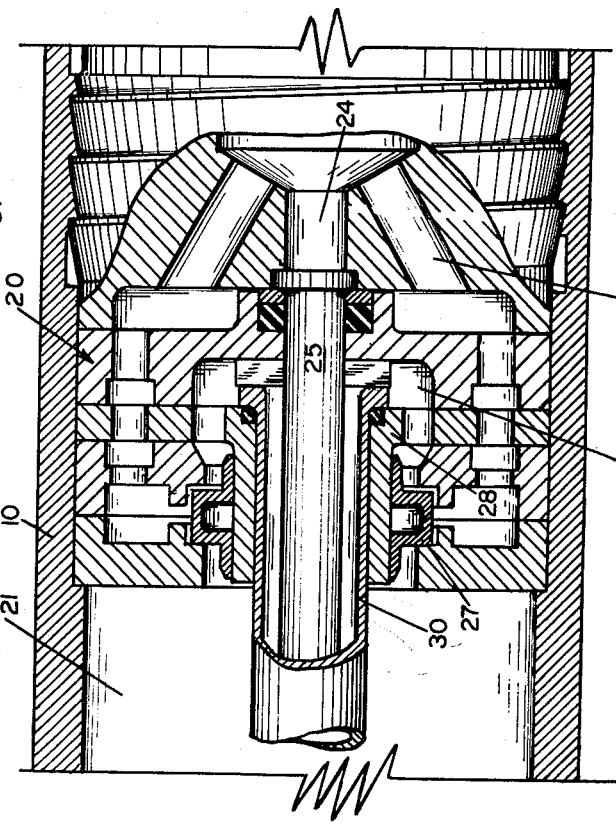
INVENTORS:
MERVIN C. HUFFMAN
HJALMER C. GUSTAFSON
GUSTAV C. PEARSON
BY: Charles W. Walton
ATTORNEY

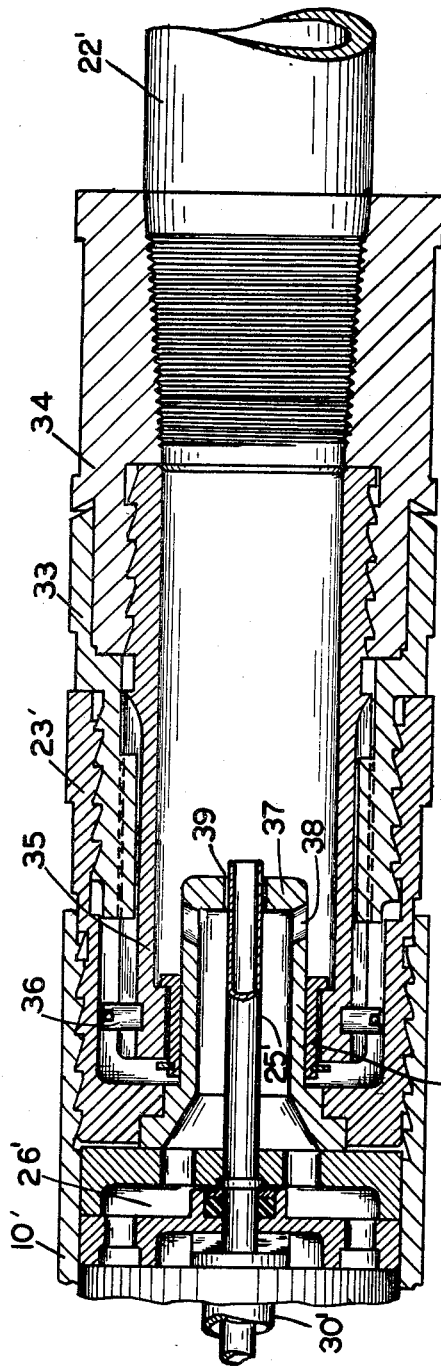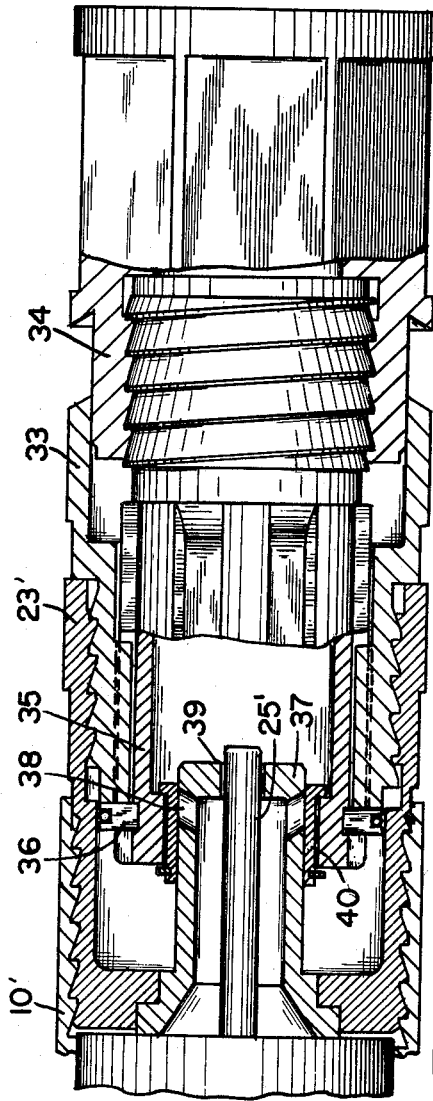

United States Patent Office 2,942,578
Patented June 28, 1960

2,942,578
ROCK DRILL
Mervin C. Huffman, Hjalmer C. Gustafson, and Gustav C. Pearson, Denver, Colo., assignors to Gardner-Denver Company, Quincy, Ill., a corporation of Delaware
Filed Apr. 24, 1957, Ser. No. 654,723
8 Claims. (Cl. 121—10)

This invention relates to rock drills, and specifically to pressure fluid operated drills of the percussion type. More particularly this invention relates to rock drills which enter the hole being drilled so that the percussive forces of the drill are transmitted directly to the drill bit.

It is accordingly an object of this invention to provide a drilling tool of novel construction.

It is a further object of this invention to provide a rock drill that will enter the hole being drilled as the drilling progresses.

Another object of the invention is to provide a drill of the type described wherein impact blows transmitted from the percussive hammer to the drill bit cause the drill and bit to move as a unit into the work being drilled. It is, of course, apparent that to accomplish this the diameter of the bit is slightly greater than that of the drill body.

Still another object of the invention is to provide a drill of the reciprocating percussive type, the blows of which are delivered directly to a cutting bit, the adjacent faces of which are substantially parallel receiving therebetween the cuttings from the bit to further reduce the same in size.

Further objects and features of this invention will become apparent from the following specification and accompanying drawings in which:

Fig. 1 is a longitudinal view, partly in section, of a drilling tool constructed in accordance with this invention;

Fig. 2 is a cross-sectional view taken along the line 2—2 of Fig. 1;

Fig. 3 is a cross-sectional view taken along the line 3—3 of Fig. 1;

Fig. 4 is an enlarged partial section of the valve assembly shown in Fig. 1;

Fig. 5 is an enlarged section of the rearward portion of the drill of Fig. 1 illustrating a modification thereof with the elements in a retracted position; and Fig. 6 is a view similar to Fig. 5 but showing the elements in an extended position.

The most common type of pneumatic percussion type rock drill, when used for vertical drilling, is mounted on a carriage or frame positioned over the area to be drilled. One end of a length of drill steel is removably attached to the front end of the drill and a drill bit is removably attached to the other end of the drill steel. In operation, the drill is fed on the carriage or frame whereby to advance the bit into the rock to be drilled. As the bit advances into the hole, the length of steel follows. However, the drill itself always remains above the surface of the ground in which the hole is being drilled. In order to drill a hole deeper than the length of drill steel, it is necessary to insert additional sections of steel between the bit and the drill as drilling progresses. For this purpose (the drill steel is threaded at each end and couplers are used to connect the lengths of drill steel to each other. As more sections of steel are added to the string of steel, the percussive force transmitted by the drill to the bit decreases because of the inherent resiliency in the lengths of steel and in the couplings together with the cycle of force transmitting waves present in each.

It is also necessary in drills of this type to conduct a cleansing medium, which may be air under pressure, through the drill and the various sections of drill steel to the bit so that the rock cuttings may be moved to the surface as the drill and drill bit advance. The narrow passages in the steel and leakage at the couplings all serve to limit the volume of air reaching the bit.

To overcome some of the practical limitations of the type of drilling heretofore described, numerous drills have been designed wherein the drill is adapted to enter the hole following the bit as the drilling progresses. As the bit and drill advance, additional lengths of steel are added behind the drill but the drill is always immediately behind the bit so that none of the percussive force is lost as the hole deepens. With such drills, drill steel may be in the form of a hollow tube or pipe having the same outside diameter as the drill itself, thus providing a relatively large conduit to conduct a considerable volume of air to the drill for its operation, with an additional volume of air to cleanse the hole of cuttings. Drills of this latter type may be rotated by independent means acting on the steel above the surface of the ground; whereas drills of the type first described are generally provided with internal means for rotating the steel and bit.

One of the factors in the design of drills adapted to enter a hole has been the dimensional limitation that the diameter of the drill must be less than the diameter of the hole to be drilled. The drill structure which is the subject of this invention is adapted to fit within a tubular elongated housing of a sufficiently small diameter to enter the hole being drilled.

Referring to the drawings, the numeral 10 indicates an elongated tubular housing. Within the housing 10 is a reciprocal piston or hammer 11 having an axial bore 12 therethrough. Retained within the forward end of the housing 10 is a tappet 13. The tappet has an axial bore 14 therethrough and is provided with a plurality of peripheral, parallel, longitudinal grooves 15 extending from its forward end rearwardly but not the entire length thereof. A plurality of slots 16 extending radially from the bore of the tappet 13 (Fig. 2) are formed in the rearward face of the tappet for a pupose to be descibed hereafter. Extending from the forward portion of the tappet is a threaded projection for the reception of a rock drill bit 17. The tappet is retained within the forward end of the housing by a tappet retainer bushing 18 which is threaded into the housing 10 and through which the threaded extension of the tappet projects.

From the drawings, it will be apparent that the bit 17 is in close proximity to the front end face of the retainer bushing 18. The rearward movement of the tappet 13 with respect to the bushing 18 is limited by the engagement of the parallel faces of the bit and bushing thus forming a rigid support for the drill upon its initial engagement with the area to be drilled. Another purpose of the adjacent parallel faces of the bit and bushing is to provide opposed faces between which cuttings from the bit may fall and be further reduced in size by a crushing action between these faces thus permitting removal of the cuttings from the drilled hole.

The tappet retainer bushing 18 is provided interiorly with a plurality of parallel longitudinal flutes 19, which are received within a portion of the longitudinal grooves 15 of the tappet 13, providing a splined connection therebetween (Fig. 3) permitting limited longitudinal movement of the tappet 13 and bit 17 outwardly of the retainer bushing 18.

Rearwardly of the hammer 11 is a valve assembly, generally indicated as 20, which closes off the housing to create an air expansion chamber 21 in which the hammer 11 may reciprocate. Pressure fluid, from a source not shown, is admitted to the housing 10 through a conduit 22 connected by means of a threaded connection to a plug member 23 which is threadably retained in the rear end of the housing.

As pressure fluid is supplied to the drill, a portion thereof is conducted through a port 24 (Fig. 4) in the valve assembly 20 to the open end of a tube 25, supported with respect to the housing 10 by the valve assembly 20. The tube 25 extends axially through the chamber 21, through the bore 12 in hammer 11, and into the bore 14 of tappet 13 to conduct pressure fluid to and through the drill bit 17 for the purpose of agitating and removing the bit cuttings as described hereafter. The rest of the pressure fluid admitted to the housing 10 is conducted through a plurality of passages 26 to an automatic valve element 27. The valve element 27 is supported for reciprocal movement on a flanged tubular element 28, the rear end of which carries a right angle flange rigidly supported with respect to the housing 10 by the complete valve assembly.

In one position of valve element 27, pressure fluid is conducted to chamber 21 rearwardly of the reciprocal hammer 11. In the other position of valve element 27, shown in Fig. 4, pressure fluid is directed through a passage 29 to the open end of a second tube 30. The tube 30 snugly fits within the tubular element 28 and is rigidly supported thereby coaxially with the tube 25, but has a bore of greater diameter than the external diameter of tube 25 providing an area sufficient to conduct pressure fluid to the forward end of chamber 21. The tube 30 extends into the bore 12 of hammer 11 supplying air to the forward end of the hammer and through slots 16, in tappet 13, to the chamber 21 forwardly of the hammer 11. The chamber 21 is provided, midway of its length, with a plurality of rearwardly directed exhaust ports 31 to exhaust air from the chamber 21 rearwardly of piston 11, and is also provided with a plurality of rearwardly directed exhaust ports 32 to exhaust air from the chamber 21 forwardly of piston 11.

The operation of the drill hereinbefore described will be readily apparent to anyone having a knowledge of rock drilling. The drill is suspended vertically and pressure fluid is supplied thereto. With the hammer 11 and valve element 27 in the positions shown in Figs. 1 and 4, the pressure fluid is conducted through passages 26 and 29, through tube 30 to the forward end of the hammer 11. The slots 16 in the rear face of tappet 13 conduct the pressure fluid to chamber 21 forwardly of the hammer 11 to move the hammer upwardly or rearwardly in chamber 21. As the hammer raises, it closes off exhaust ports 31 compressing the air remaining in chamber 21 rearwardly of exhaust ports 31. This compressed air in chamber 21, acting upon a forward face of valve element 27, causes the valve to shift rearwardly on the flanged element 28. It will also be noted that as hammer 11 continues to rise, after closing exhaust ports 31, exhaust ports 32 are opened to exhaust the pressure in chamber 21 forwardly of the piston, as well as the pressure acting on the rear face of valve 27, to atmosphere.

With the valve element 27 in its rearward position, the supply of pressure fluid to tube 30 ceases and pressure fluid is then supplied directly from the valve element 27 to chamber 21 rearwardly of the hammer 11, forcing the hammer down to strike the tappet 13. As the hammer moves toward the tappet, exhaust ports 32 are again closed causing the air remaining in chamber 21 in advance of the hammer to be compressed. This compressed air is conducted through slots 16 in tappet 13, tube 30, and passage 29 to the rearward face of valve element 27, shifting the same back to its original position. It will again be noted that, as the hammer 11 reaches the end of its downward movement, the exhaust ports 31 are again uncovered to exhaust the pressure in chamber 21 rearwardly of the hammer as well as the pressure acting on the forward face of the valve element 27 to atmosphere, and the cycle repeats itself.

As the hammer continues to reciprocate, the percussion blows of the hammer will be transmitted through the tappet 13 to the bit 17 active upon the rock formation being drilled. As the rock formation is chipped away, air conducted to the bit through tube 25 blows the chips rearwardly about the outer diameter of housing 10. As the chips pass the rearwardly directed exhaust ports 32 and 31, the exhaust air from chamber 21 supplies additional air to blow the chips rearwardly and out of the hole being drilled.

It has been observed, during operation of the drill herein described, that large chips which pass through relief slots in the drill bit, but are too large to pass between the drill and the bore of the drilled hole, are crushed between the adjacent faces of the drill bit 17 and the tappet retainer bushing 18 as the bit reciprocates with respect to the drill as hereinbefore described.

While no showing has been made of means for rotating the drill bit, various conventional external or internal rotation means may be used for this purpose.

As drilling progresses and the rear end of the drill enters the hole, conduit 22 may be removed and one end of a length of hollow tubing or pipe may be threaded into the threaded connection of plug member 23. Conduit 22 is then threaded into the other end of the tubing or pipe to supply air through the tube or pipe to the drill. Additional lengths of tubing may be progressively added in this manner until the desired depth of hole is obtained.

Figs. 5 and 6 illustrates a portion of the drill of Fig. 1 with an automatic throttle valve added thereto. The plug 23' is bored out to receive a stop collar 33. Within the collar 33, a cylindrical element 34 is received to which an elongated sleeve 35 is connected. The sleeve 35 and cylindrical element 34 are slidable axially with respect to plug member 23' and housing 10', but are limited in such movement by a stop 36 carried by sleeve 35 and coacting with the stop collar 33.

A tubular extension 37, having a plurality of ports 38 therethrough, extends the entrance to passage 26' rearwardly into the bore of sleeve 35. The blowing tube 25' is also extended rearwardly through a port 39 in the end of the extension 37. A cylindrical valve element 40, supported on the exterior diameter of extension 37 and movable by internal projections of elongated sleeve 35, is adapted in one position thereof to close ports 38 to prevent air from entering the drill therethrough without interrupting the supply of presure fluid to the tube 25' and thence to the bit as heretofore described. The structure may be designed to completely interrupt the supply of pressure fluid to the drill when ports 38 are closed by sliding valve 40. However, as shown, the port 39 has an internal diameter that is greater than the external diameter of tube 25' providing an area for the passage of a limited amount of pressure fluid to the valve assembly and to the drill even when ports 38 are closed. The amount of air pressure so admitted is sufficient to cause the hammer to reciprocate enough to cause the drill to vibrate and to assure passage of air through its exhaust ports, thereby facilitating insertion and removal of the drill in the hole being drilled and assuring that the exhaust ports will not become clogged with dirt and debris. With this structure, it is obvious that when the drill is suspended by the air hose 22' or drill pipe, the weight of the drill will cause housing 10' and the parts connected thereto to move to an extended position (Fig. 6) with relation to cylindrical element 34 and sleeve 35, in which position ports 38 are closed by valve element 40 preventing the full flow of fluid to the drill. This closure of the ports continues until the drill bit engages the area being drilled, whereupon housing 10' and the parts connected thereto shift to a retracted position (Fig. 5) with respect to element 34 and sleeve 35, and extension 37 carried by the main portion of the drill moves axially with respect to valve element 40 to open ports 38 permitting maximum flow of operating fluid to the drill.

It will be obvious to one skilled in the art of rock drilling and rock drills that the invention herein described lends itself to additional variations and modifications which will fall within the scope of the invention claimed.

We claim as our invention:

1. A pressure fluid operated tool of the percussion type comprising a tubular housing adapted for connection at its rearward end to a source of pressure fluid, means mounted at the forward end of said housing for supporting a drill bit, valve means including a reciprocable valve member supported adjacent to the rearward end of said housing, said bit supporting means and said valve means defining a chamber in said housing, a recprocable hammer within said chamber having an axial bore therethrough, a tube supported at its rearward end by said valve means and extending into the bore of said hammer in substantial fluid sealing relation therewith, said valve member disposed in one position thereof to direct pressure fluid to said chamber rearwardly of said hammer and in another position thereof to direct pressure fluid through said tube to said chamber forwardly of said hammer.

2. A pressure fluid operated tool of the percussion type comprising a tubular housing adapted for connection at its rearward end to a source of pressure fluid, a tappet mounted at the forward end of said housing for limited axial movement and adapted to receive a drill bit, valve means including a reciprocable valve member supported adjacent to the rearward end of said housing, said tappet and said valve means defining a chamber in said housing, a reciprocable hammer within said chamber having an axial bore therethrough, a tube supported at its rearward end by said valve means and extending into the bore of said hammer in substantial fluid sealing relation therewith, said valve member disposed in one position thereof to direct pressure fluid to said chamber rearwardly of said hammer and in another position thereof to direct pressure fluid through said tube to said chamber forwardly of said hammer.

3. A tool as set forth in claim 2 wherein said tappet is provided with an axial bore, and a second tube extending from the rearward end of said housing through said valve assembly, said first tube, said hammer, and into said tappet bore to supply pressure fluid to the forward end of said tool.

4. A tool as set forth in claim 2 wherein said housing is provided with at least two axially spaced exhaust ports disposed to direct fluid from said chamber to the exterior of said housing and rearwardly along said tool, said hammer during its rearward stroke covering one of said ports and uncovering the other of said ports at the rearward limit of said stroke, and said hammer during its forward stroke covering said other port and uncovering said one port at the forward limit of said forward stroke.

5. In a pressure fluid operated tool of the percussion type: a tubular housing adapted for connection at its rearward end to a source of pressure fluid; a chamber within said housing; a reciprocable hammer within said chamber, said hammer having an axial bore therethrough; a tubular support element rigid with respect to said housing rearwardly of said chamber; a tube extending into said chamber and into said bore of said hammer in sliding engagement therewith, the rearward end of said tube supported in said support element; a valve member also supported by said support element for reciprocating movement and adapted in one position thereof to direct pressure fluid to said chamber rearwardly of said hammer and in another position thereof to direct pressure fluid through said tube to said chamber forwardly of said hammer; and said housing having exhaust ports communicating said chamber with the exterior of said housing and disposed to direct fluid rearwardly along said housing.

6. In a pressure fluid operated tool of the percussion type: a tubular housing adapted for connection at its rearward end to a source of pressure fluid; a chamber within said housing; a reciprocable hammer within said chamber, said hammer having an axial bore therethrough; a tubular support element rigid with respect to said housing rearwardly of said chamber; a tube extending into said chamber and into said bore of said hammer in sliding engagement therewith, the rearward end of said tube supported in said support element; a valve member also supported by said support element for reciprocating movement and adapted in one position thereof to direct pressure fluid to said chamber rearwardly of said hammer and in another position thereof to direct pressure fluid through said tube to said chamber forwardly of said hammer; means defining ports through said housing to conduct spent pressure fluid from said chamber directly to the exterior of said housing and rearwardly along said housing; and a second tube extending through said first tube to conduct a cleansing medium from the rearward end to the forward end of said tool.

7. A pressure fluid operated tool of the percussion type comprising a tubular housing, a chamber within said housing, a reciprocable hammer within said chamber, said hammer having an axial bore therethrough, a support member rigid with respect to said housing rearwardly of said chamber, a tube supported at its rearward end by said support member extending into said chamber, said tube extending into said bore of said hammer in sliding engagement therewith, a valve member supported for reciprocating movement on said support member, said valve member adapted in one position thereof to direct pressure fluid to said chamber rearwardly of said hammer and in another position thereof to direct pressure fluid through said tube to said chamber forwardly of said hammer, a closed tubular member extending rearwardly from said valve member, the side walls of said tubular member having a plurality of ports for directing fluid to said valve member, means defining a fluid chamber mounted at the rearward end of said housing for limited longitudinal movement with respect thereto, said chamber means being adapted for connection at its rearward end to a source of pressure fluid, the forward end of said chamber means having an opening for receiving said tubular member, the walls of said opening serving to close said ports in said tubular member when said chamber means is extended with respect to said housing, and said ports being in communication with said last named fluid chamber when said housing and said chamber means are not extended.

8. A tool as set forth in claim 2 wherein a collar is secured to the rearward end of said housing through a lost motion coupling, and said housing and said collar having complementary throttle valve means for restricting the flow of pressure fluid to said first valve means when said collar and said housing are relatively extended.

References Cited in the file of this patent

UNITED STATES PATENTS

| 1,176,041 | Dunbar | Mar. 21, 1916 |
| 1,848,340 | Gilman | Mar. 8, 1932 |
| 2,003,121 | Schorle | May 28, 1935 |
| 2,090,032 | Curtis | Aug. 17, 1937 |
| 2,800,884 | Mori | July 30, 1957 |
| 2,837,317 | Hulshizer | June 3, 1958 |
| 2,851,251 | Mori | Sept. 9, 1958 |

FOREIGN PATENTS

| 937,161 | Germany | Dec. 29, 1955 |